Nov. 27, 1962

R. BECKNELL 3,065,832

FRICTION CLUTCHES

Filed July 9, 1959

INVENTOR.
RALEIGH BECKNELL
BY
Joseph A. Rave
Attorney

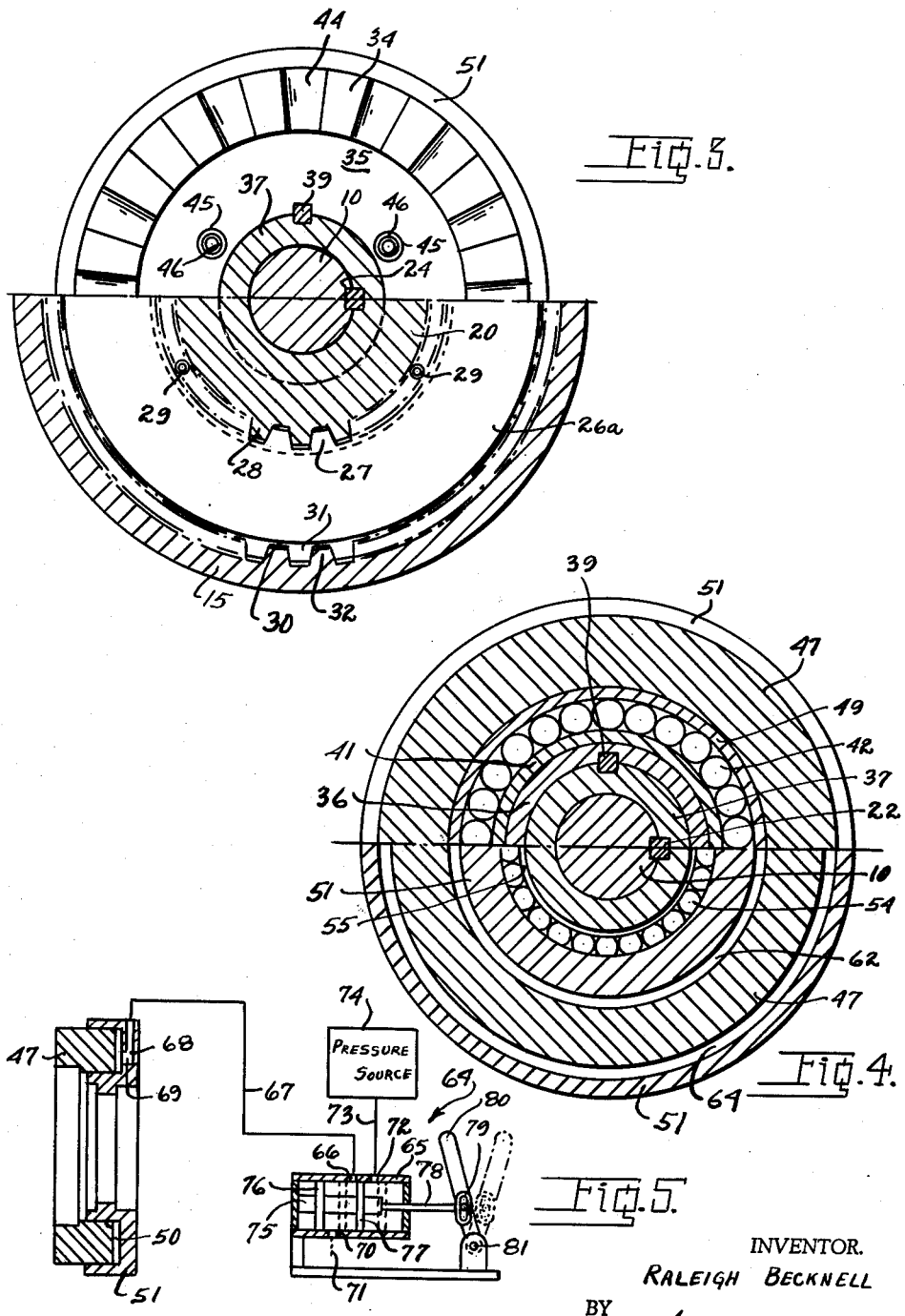

3,065,832
FRICTION CLUTCHES
Raleigh Becknell, Cincinnati, Ohio, assignor to The Conway Clutch Company, Cincinnati, Ohio, a corporation of Ohio
Filed July 9, 1959, Ser. No. 825,973
2 Claims. (Cl. 192—85)

This invention relates to improvements in friction clutches and particularly to the operating mechanism of said clutches.

This invention discloses improvements in the pending application of Raleigh Becknell, Serial Number 743,202, filed June 19, 1958.

As noted in said pending application friction clutches, particularly those of the disc type, have in the past generally been operated through mechanical means, that is, by mechanically and manually operated sliders and friction disc pressing members operated by the said sliders. Attempts have been made to utilize a fluid medium, compressed air, for example, as a means for effecting the friction disc compression; but such mechanisms have included structure that could result in early failure and damage to the parts.

The present invention is particularly adapted to overcome the failures and poor construction of prior devices.

It is, therefore, the principal object of the present invention to provide a clutch of the friction disc type which is operated by a fluid medium under pressure and whose construction has been materially improved thereby resulting in a simplification in operation.

Another object of this invention is the provision in a friction disc clutch of rotating anti-friction bearings, particularly the ball type, which positively cooperate with the shifting mechanism in compressing the friction discs and thereby materially increase the life of the parts.

It is a further and specific object of the present invention to provide a friction disc clutch operable through a fluid medium under pressure in a more efficient manner than has heretofore been provided without increasing the cost of producing, acquiring and maintaining the clutch.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, wtihout departing from or exceeding the spirit of the invention.

In the drawings:

FIG. 3 is a vertical, sectional view through the clutch of FIG. 1 as seen from line 3—3 on said FIG. 1.

FIG. 4 is a view similar to FIG. 3 taken through planes ahead of those in FIG. 3 as seen from line 4—4 on FIG. 1.

FIG. 5 is a diagrammatic view illustrating a fluid pressure medium circuit including a control valve for operating the clutch of the present invention.

Throughout the several views of the drawings similar reference characters are employed to denote the same or similar parts.

Figures 1, 2:
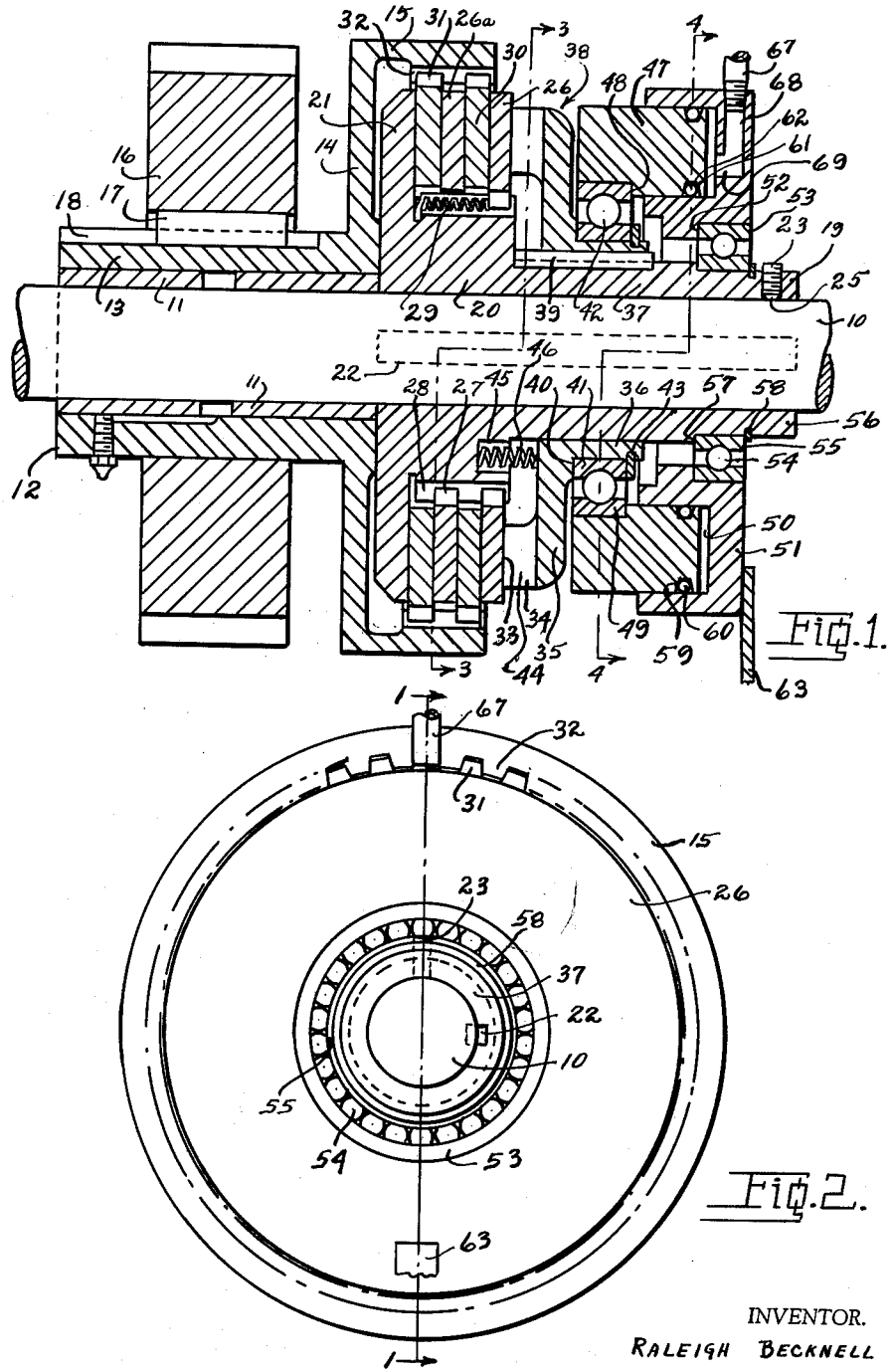
FIG. 1 is a vertical sectional view through a friction disc clutch of the present invention as more particularly seen from line 1—1 on FIG. 2.
FIG. 2 is an end elevation of the friction disc clutch of FIG. 1 as seen from the right hand end of said FIG. 1.

It is well known that a clutch may be employed to transmit motion and power between two shafts, a prime mover and a shaft, a shaft and a driven member, all of which is to be considered within the purview of the following description, wherein the clutch is being described as effecting the rotation of a shaft on which it is mounted and secured.

Accordingly, as disclosed in the drawings, use is made of a shaft 10 which is to be driven and has freely mounted thereon through bushings or bearing sleeves 11 the clutch driving member 12. The clutch member 12 is substantially cup shaped and includes a sleeve 13 with a radial flange 14 at one end. The radial flange 14 at its periphery is provided with a cup shaped receptacle or flange 15 within which is disposed the clutch discs as will presently be made clear.

Mounted on the sleeve 13 is the motion or power receiving member, disclosed in the drawings as a gear 16. The gear 16 is secured to the sleeve 13 in any suitable or desirable manner such as by a key 17 projecting from the inner bore thereof into a keyway 18 in the said sleeve 13.

Partially disposed within the driving clutch member cup flange 15 is a driven clutch member indicated in its entirety by the reference numeral 19. The driven clutch member 19 includes a central hub portion 20 from the inner end of which radially projects a flange 21 which forms the main thrust member for the friction clutch discs as will subsequently be made clear. The driven clutch member 20 is secured, in any suitable manner, to the shaft 10 as by a key 22 and dog screw 23. The key 22, as seen particularly in FIGS. 3 and 4, is disposed in a keyway 24 formed into the shaft 10 while the dog screw 23, see FIG. 1, has a reduced end portion 25 which engages the surface of the shaft 10 in a manner well known with this type of securing screw.

Disposed on the periphery of the driven clutch member central hub portion 20 is one or more discs 26, there being two such discs disclosed in FIG. 1. The said discs 26 are formed to a diameter equal, substantially, to that of the driven clutch member flange and thrust element 21 and each of said discs 26 has its inner bore formed as an internal gear which, in effect, means that the said discs each have a plurality of inwardly projecting teeth or lugs 27.

The internal gear teeth of said friction discs 26 are in alignment with one another and are adapted to be meshed with similarly formed gear teeth on the hub 20, said hub gear teeth being clearly shown at 28 in FIG. 3. At intervals certain of the projections or gear teeth on the innermost disc, that is, the disc 26a, so identified for convenience in description, are removed to provide a passageway for clutch discs separating springs 29, operable for a purpose subsequently to be made clear. As shown in FIG. 1 the said spring 29 has one end abutting with the driven clutch member thrust flange 21 and its other end abutting with the outermost friction disc gear tooth or projection 27 that is aligned with the removed gear tooth of the inner disc 26a. In practice, use is made of three such springs 29 equally spaced from one another and one of which springs is illustrated in FIG. 1 while the other two are illustrated in FIG. 3.

The said driven clutch discs 26 are spaced from one another and the inner of said friction disc 26a is likewise spaced from the driven clutch member thrust flange 21 by driving clutch discs 30. Said driving clutch discs 30 have an inner diameter or bore slightly greater than the outside diameter of the driven clutch member central hub portion gear 28 and each of said driving clutch discs has its periphery formed as a gear for thereby providing gear teeth or projections 31 on the periphery thereof. The said driving clutch discs have their projections or teeth in alignment with one another and are disposed in spaces between an internal gear teeth 32 formed inwardly of the inner surface of the driven clutch member cup flange 15, all as clearly illustrated in FIG. 3.

From the foregoing it will be noted that the driving clutch discs 30 are connected through gear teeth with the driving clutch member 12 while the driven clutch discs 26 are connected with the driven clutch member 19 through similar gear teeth. It should be noted however that the connection between these parts may be effected in any other known manner such as spaced lugs from the periphery of the driving clutch discs and similarly spaced lugs from the bore of the driven clutch discs with said lugs entering keyways in their mating and cooperating parts.

It should be further noted that the springs 29 not only separate the driven clutch discs from the main thrust flange 21 but also separate the clutch discs from one another except when a driving connection is desired and established between said friction discs.

The outer clutch disc of the group, shown in the drawing as the outer driven clutch disc 26, has contacting its outer surface, as at 33, the free edge of a ring-like flange 34 extending inwardly of the outer periphery of a clutch disc shifter member body portion 35. The said clutch shifter member body portion 35 has projecting from its other side a sleeve 36 mounted on, for sliding movement relative thereto, the driven clutch member sleeve 37, extending from the driven clutch member central hub portion 20. While the clutch shifter member, indicated in its entirety by the reference numeral 38, is mounted for sliding movement on the sleeve 37, it is prevented from independent rotation through a key 39 secured to and upstanding from the said driven clutch member sleeve 37. The clutch shifter sleeve 36 forms with the clutch shifter body portion 35 a shoulder 40 against which the inner race 41 of an anti-friction ball bearing, indicated in its entirety by the reference numeral 42, abuts. Said ball bearing inner race 41 is pressed onto the sleeve 36 and held against independent movement and against the shoulder 40 by retainer ring 43 secured in the shifter sleeve 36 inwardly of its free end.

The shifter member ring-like flange 34 throughout the surface thereof contacting the clutch disc is provided with spaced passageways 44 to permit the passage of cooling air across or through the contacting parts. In practice said air passageways, with the solid portion of the shifter member therebetween, act as a fan for forcing air between the said shifter member and the outermost clutch disc 26. The driven clutch member central hub 20 is opposed to the shifter member body portion and is provided with a plurality of sockets 45, in practice, and as shown in the drawings, three such sockets, in each of which is disposed a coil spring 46. As seen in FIG. 1 the coil spring 46 has its one end abutting the base of its socket 45 and its other end abutting the opposing surface of the shifter member body portion 35. It should be noted that the said springs are equally spaced from one another and that one of said springs, as noted above, is illustrated in FIG. 1 while the other two springs are illustrated in FIG. 3.

Encircling the shifter sleeve 36 is the outer end of a further shifter member 47 which, as will later be made clear, is a piston adapted to be moved by a fluid medium under pressure. Said shifter member-piston 47 is provided with a counter-bore, the base of which forms a shoulder 48 and in which counter-bore is disposed the outer race 49 of the ball bearing 42. The said race 49 being secured in said shifter-piston in any suitable or desirable manner such as by pressing the same into one another.

The shifter-piston 47, as illustrated in FIGS. 1 and 4, is a ring received in a cylinder channel 50 formed inwardly of the inner face of a ring-like member or piston cylinder housing 51. The piston cylinder 51 is provided inwardly of its outer surface with a counter-bore terminating in a base or seat forming a shoulder 52 and in which counter-bore and against its seat or shoulder 52 is pressed the outer race 53 of a ball bearing, indicated in its entirety by the reference numeral 54. The inner race 55 of said ball bearing 54 is pressed onto the reduced diameter end 56 of the driven clutch member sleeve 37 and which reduced diameter portion provides a shoulder 57 against which the said race 55 is abutted. The ball bearing 54 and particularly its inner race 55 is retained on said driven clutch member sleeve portion 56 against independent movement by a retainer ring or collar 58 secured in the sleeve 37 at a point adjacent the outer edge of the ball bearing 54.

To insure the operation of the shifter-piston 47 and prevent any leakage from the channel 50 around said piston, it is provided on its outer periphery and adjacent its inner end with a groove 59 in which is disposed a compressible gasket which conveniently takes the form of an O-ring 60. Similarly to prevent leakage through the bore of the ring-like piston it is provided with a groove 61 upwardly of its inner periphery and with said groove likewise being provided with a compressible gasket, again in the form of an O-ring 62.

In practice the cylinder housing 51 is retained or held against rotation and for which purpose it is provided with a securing bracket 63 which may take any suitable or desirable form depending upon the particular location of the clutch with respect to the surrounding or adjacent mechanism.

Any suitable or desirable means may be employed for connecting a pressure source with the channel 50 of the piston cylinder or housing 51 and its shifter piston 47, such means, as diagrammatically illustrated in FIG. 5, may take the form of a manually operated valve indicated in its entirety by the reference numeral 64. The illustration of the valve 64 is diagrammatic and comprises a sleeve 65 closed at its opposite ends and provided with a plurality of ports including port 66 with which is connected one end of a pipe or conduit 67 that has its other end connected with a port 68 radially of the piston cylinder housing 51 and which radial port 68 has an angularly related port 69 extending therefrom into the said housing channel 50. A second port 70 in the valve sleeve 65 is connected to atmosphere as indicated at 71 while a further port 72 in the valve sleeve 65 has connected therewith one end of a pipe or conduit 73 that terminates at its other end with a suitable pressure source 74.

Disposed within the valve sleeve 65 is a spool type valve 75 having formed thereon lands 76 and 77 forming between them connecting passageways for alternately connecting the pipe or conduit 67 with the atmosphere 71 and the pressure source 74. The position of the said valve spool as illustrated in solid lines in FIG. 5 connects the said pipe or conduit 67 from the piston cylinder housing 51 with the atmosphere 71 wherefore the springs 29 have separated the clutch discs 26 and 30 and the springs 46 have separated the shifter member ring flange 34 and friction disc 26 so that no motion or power is being transmitted through the clutch. The second position of the valve spool 75 is illustrated in dotted lines in FIG. 5 and at which time the pipe or conduit 67 from the piston cylinder housing 51 would be connected with the pipe or conduit 73 from the pressure source 74 for actuating the shifter-piston 47 to the left as seen in FIG. 1 and for establishing a friction driving connection between the discs 26 and 30 and between the shifter mechanism ring flange 34 and driven clutch member radial flange 21.

In order to shift the valve spool 75 it has projecting therefrom a rod 78 having at its outer end a pivotal connection 79 with a lever 80 which in turn is pivotly connected at 81 to a supporting bracket.

From the foregoing it will be noted that the clutch discs shifter comprises, in effect, two shifter members, the member 38 and the piston shifter 47, and which are rotatable relative to one another, that is, the piston 47 is held stationary by friction with the piston cylinder housing 51 while the shifter member 38 is rotating with and when the driven clutch member 19 is rotated. At the same time there is no independent axial movement of said shifter members relative to one another since they each have secured thereto one of the races of the interposed ball bearing 42. At the same time it should be noted that neither race is movable with respect to its member, wherefore all relative rotation between the shifter members is on the ball bearing thereby insuring complete and positive operation of these parts in the most desired manner.

It should further be noted that the ball bearing between the driven clutch member sleeve and the piston cylinder housing is held against any independent movement and all relative rotation is through the ball bearing 54 again insuring the operation of this ball bearing in its desired and intended manner.

What is claimed is:

1. In a friction disc clutch of the class described for transmitting motion from a prime mover to a shaft, the combination with said shaft, of a driving clutch member freely rotatable on said shaft, a driven clutch member secured to said shaft, a separate clutch disc operatively connected with each driving and driven clutch member, an abutment on said driven clutch member, said clutch discs being adapted to be axially shifted relative to the clutch members and pressed into driving engagement with one another against the driven clutch member abutment and with the clutch disc connected to the driving clutch member engaging the driven clutch member abutment and the other clutch disc outwardly thereof, a clutch disc shifter member shifting said clutch discs and having a body portion keyed to said driven clutch member for rotation with and independent axial movement relative to said driven clutch member, said shifter member including a reduced portion projecting from one side of said body member portion, said shifter member further including a ring-like flange projection from the other side of its body portion having face contact with the outward clutch disc, a fluid pressure medium actuated ring-like piston including a projecting counter-bored portion concentric with and radially, outwardly of said shifter member reduced portion, an anti-friction ball bearing between the shifter member reduced portion and concentric projecting piston portion counter-bore with the inner race of said ball bearing fixed to the shifter member reduced portion and the outer race of said ball bearing fixed in the piston projecting portion counter-bore and through which ball bearing the shifting force is transmitted, a ring-like housing for the ring-like piston having a body portion between an external diameter and a concentric central aperture and a front face and a back face parallel with one another with a piston cylinder groove formed through the front face and extending toward the back face, said piston cavity being located radially of the ring-like housing between its external diameter and central aperture and receiving the ring-like piston portion behind its projecting portion, said driven clutch member having a projecting sleeve concentric with and radially, inwardly spaced from the ring-like piston housing, an anti-friction ball bearing between the concentrically arranged piston housing and driven clutch member sleeve with the inner race of said ball bearing fixed to the driven clutch member sleeve and the outer race of the ball bearing fixed in the piston housing, and means holding said piston housing against rotation while the driven clutch member is rotating.

2. In a friction disc clutch of the class described for transmitting motion from a prime mover to a shaft, the combination with said shaft, of a driving clutch member freely rotatable on said shaft, a driven clutch member secured to said shaft, a separate clutch disc operatively connected with each driving and driven clutch member, an abutment on said driven clutch member, said clutch discs being adapted to be axially shifted relative to the clutch members and pressed into driving engagement with one another against the driven clutch member abutment and with the clutch disc connected to the driving clutch member engaging the driven clutch member abutment and the other clutch disc outwardly thereof, a clutch disc shifter member shifting said clutch discs and having a body portion keyed to said driven clutch member for rotation with and independent axial movement relative to said driven clutch member, said shifter member including a reduced portion projecting from one side of said body member portion, said shifter member further including a ring-like flange projection from the other side of its body portion having face contact with the outward clutch disc, a fluid pressure medium actuated ring-like piston including a projecting counter-bored portion concentric with and radially, outwardly of said shifter member reduced portion, an anti-friction ball bearing between the shifter member reduced portion and concentric projecting piston portion counter-bore with the inner race of said ball bearing fixed to the shifter member reduced portion and the outer race of said ball bearing fixed in the piston projecting portion counter-bore and through which ball bearing the shifting force is transmitted, a ring-like housing for the ring-like piston having a body portion between an external diameter and a concentric central aperture and a front face and a back face parallel with one another with a piston cylinder groove formed through the front face and extending toward the back face, said piston cavity being located radially of the ring-like housing between its external diameter and central aperture and receiving the ring-like piston portion behind its projecting portion, said driven clutch member having a projecting sleeve concentric with and radially, inwardly spaced from the ring-like piston housing, an anti-friction ball bearing between the concentrically arranged piston housing and driven clutch member sleeve with the inner race of said ball bearing fixed to the driven clutch member sleeve and the outer race of the ball bearing fixed in the piston housing, means holding said piston housing against rotation while the driven clutch member is rotating, and said shifter member ring-like flange projection having formed through its contacting face passageways acting as ducts and forcible air passageways forcefully forcing air relative to the clutch discs.

References Cited in the file of this patent

UNITED STATES PATENTS

| | | |
|---|---|---|
| 1,864,126 | Ferris | June 21, 1932 |
| 2,345,860 | Scott-Iversen | Apr. 4, 1944 |
| 2,587,230 | Schaad | Feb. 26, 1952 |
| 2,806,567 | Bonquet | Sept. 17, 1957 |
| 2,827,142 | Aschauer | Mar. 18, 1958 |
| 2,868,027 | Oberholtz et al. | Jan. 13, 1959 |

FOREIGN PATENTS

| | | |
|---|---|---|
| 17,167 | Great Britain | of 1911 |
| 927,346 | France | Apr. 28, 1947 |
| 130,830 | Sweden | Feb. 13, 1951 |